United States Patent
Zollner et al.

(10) Patent No.: US 7,197,552 B2
(45) Date of Patent: Mar. 27, 2007

(54) OPTIMIZED DYNAMIC SYSTEM RESTART SEQUENCE FOR A WIDE AREA COMMUNICATION SYSTEM

(75) Inventors: Mark P. Zollner, Palatine, IL (US); Randy L. Ekl, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 758 days.

(21) Appl. No.: 10/082,405

(22) Filed: Feb. 25, 2002

(65) Prior Publication Data

US 2003/0163557 A1 Aug. 28, 2003

(51) Int. Cl.
*G06F 15/173* (2006.01)
(52) U.S. Cl. .............. 709/223; 709/224; 709/201; 455/512; 455/518; 719/318
(58) Field of Classification Search ............... 709/223, 709/201, 249, 224–226, 207; 455/512, 518–520; 370/432; 719/318
See application file for complete search history.

(56) References Cited

U.S. PATENT DOCUMENTS

| 5,101,502 A * | 3/1992 | Felderman et al. ......... 455/520 |
| 5,371,780 A * | 12/1994 | Amitay ....................... 455/450 |
| 5,659,881 A * | 8/1997 | Kent ........................... 455/520 |
| 6,058,305 A * | 5/2000 | Chavez, Jr. ............... 455/426.1 |
| 6,205,335 B1* | 3/2001 | Furusawa et al. ........... 455/512 |
| 6,708,209 B1* | 3/2004 | Ebata et al. ................. 709/223 |
| 6,747,957 B1* | 6/2004 | Pithawala et al. .......... 370/252 |
| 2002/0091944 A1* | 7/2002 | Anderson et al. ........... 709/223 |
| 2003/0005112 A1* | 1/2003 | Krautkremer ............... 709/224 |

\* cited by examiner

*Primary Examiner*—Philip B. Tran
(74) *Attorney, Agent, or Firm*—Steven R. Santema; Indira Saladi

(57) ABSTRACT

Methods for determining a optimized restart sequence for sites, communication devices and/or zones are disclosed. A rule based criteria is determined for prioritizing sites (102) is determined by a zone controller (126), in one embodiment, by downloading from a network manager (128). Based on the criteria, a restart sequence is determined (304) for the sites. In the event of a system restart, service is established (306) for the sites in order of the restart sequence. In one embodiment, the zone controller receives (404) system usage information and determines (406) a restart sequence based on the rule-based criteria in combination with the system usage information.

17 Claims, 3 Drawing Sheets

OPTIMIZED DYNAMIC SYSTEM RESTART SEQUENCE FOR A WIDE AREA COMMUNICATION SYSTEM

FIELD OF THE INVENTION

This invention relates generally to communication systems, and particularly communication systems having multiple sites and/or zones.

BACKGROUND OF THE INVENTION

Communication systems typically include a plurality of communication devices, such as mobile or portable radio units (sometimes called "subscribers"), dispatch consoles, call loggers and base radios (sometimes called base stations or base site repeaters) that are geographically distributed among various base sites and infrastructure sites. The radio units wirelessly communicate with the base stations and each other using radio frequency (RF) communication resources, and are often logically divided into various subgroups or talkgroups. Communication systems are often organized as trunked systems, where the RF communication resources are allocated on a call-by-call basis among multiple users or groups. Large communication systems are sometimes organized into a plurality of "zones," wherein each zone includes multiple sites and a central controller or server ("zone controller") for allocating communication resources among the multiple sites.

A problem that arises in communication systems, most particularly in large systems comprising several sites and/or zones, is that it can take several minutes to bring all of the sites and/or zones into service after failures, system upgrades, and the like. A related problem is there is no deterministic order for determining which sites/zones should be established first (or nearly first). Consequently, inefficiencies arise in that less important sites/zones may be brought into service several minutes before the more important sites. For example, consider a talkgroup call initiated during a "coming in service" period having members at multiple sites. In present day systems, it is possible that members at certain sites will miss the call entirely, or at least a large portion of the call, while their site is awaiting service, even while non-participating sites are coming into service. Generally, it would be desirable to bring participating sites into service before the non-participating sites to optimize participation in the talkgroup.

Accordingly, there is a need for a systematic, rule-based method that optimally determines a restart sequence for certain sites/zones, etc. after failures, system upgrades, etc. Advantageously, the rules for prioritization may be defined, and/or changed dynamically, by the system operator. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
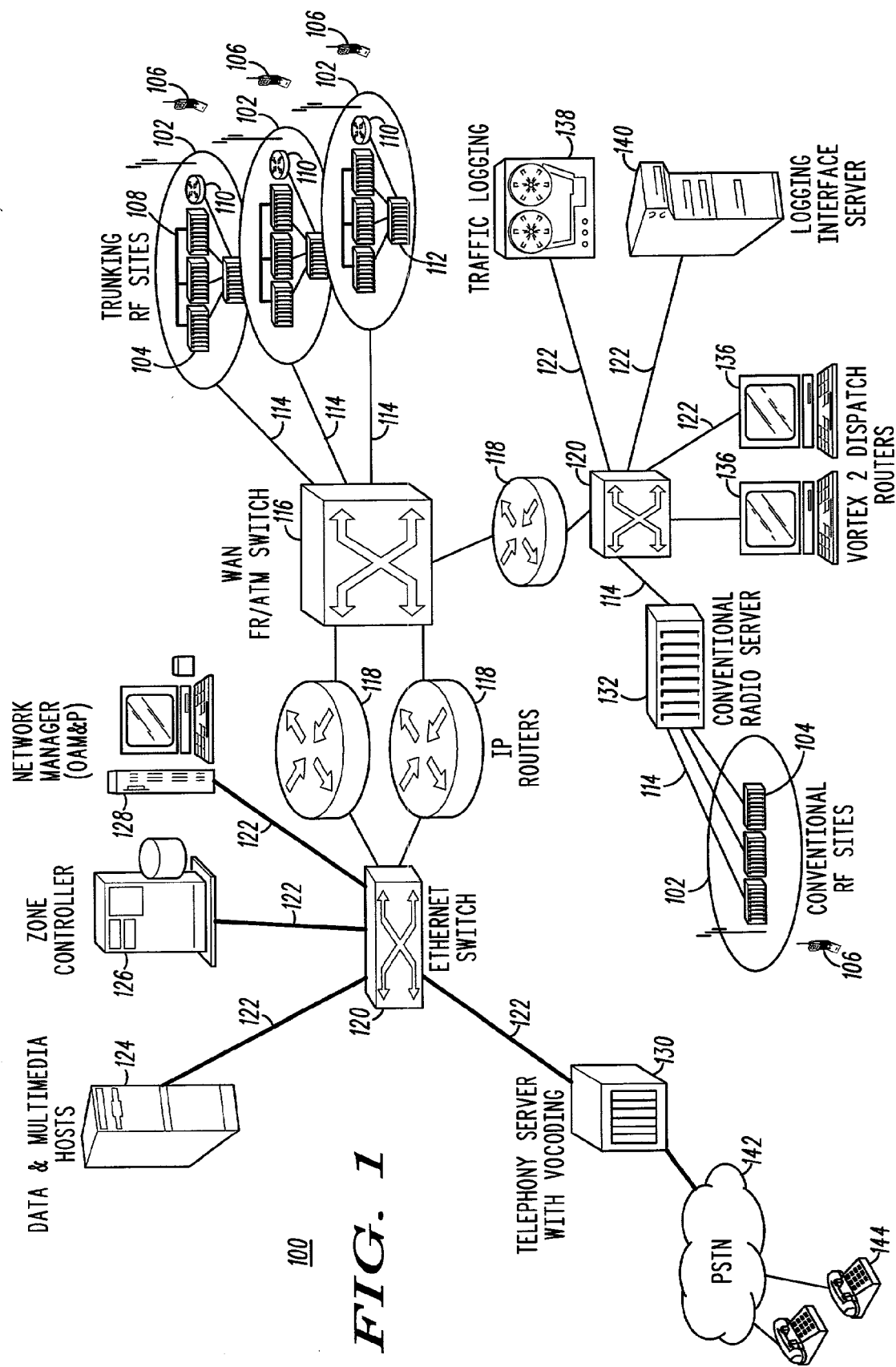
FIG. 1 shows an example single-zone communication system operable to utilize a system restart sequence according to the invention.

Turning now to the drawings and referring initially to FIG. 1, there is shown by way of example and not limitation, a single-zone communication system 100 comprising a plurality of communication devices distributed among various sites 102. The sites 102 include trunking RF sites, conventional RF sites and may also include one or more console sites or other infrastructure sites.

The trunking RF sites each include a plurality of base radios 104 that are assigned on a call-by-call basis to communication units 106 within their respective coverage areas. The base radios 104 are linked by LANs 108 to respective site routers 110 and base site controllers 112. The base site controllers 112 may be used to control the communication of payload and/or control messages between base radio(s) at a particular site. A site controller may also control communications between the base radio(s) and their associated router.

The trunking RF sites are connected by WAN links 114 to a central switch 116 comprising, for example, a frame relay or ATM switch. Alternatively, in a packet-based communication system, the central switch 116 may be replaced by one or more router elements (often termed a "core router"). The WAN links 116 may comprise T1 links, optical links or generally any type of link adapted for digital communications. The central switch 116 is logically coupled, via router elements 118 to various Ethernet switches 120. (Alternatively, in a packet-based system, the core router is connected to various site routers.) As shown, the Ethernet switches 120 are connected by links 122 to infrastructure devices including data and multimedia hosts 124, a zone controller 126, a network manager 128, telephony server 130, conventional radio server 132, dispatch consoles 136, and logging devices 138, 140. The links 122 may comprise LAN links or any other suitable equivalent known in the art. The router elements 118 may be embodied in separate physical devices (i.e., "routers") or combinations of such devices.

In one embodiment, all of the infrastructure devices (including the above identified devices, as well as base radios 104 and base site controllers 112) comprise IP-addressable host devices that are able to send and receive IP datagrams between other host devices of the communication system 100. Each host device has a unique IP address. The host devices include respective processors (which may comprise, for example, microprocessors, microcontrollers, digital signal processors or combination of such devices) and memory (which may comprise, for example, volatile or non-volatile digital storage devices or combination of such devices).

The data and multimedia hosts 124 comprise host devices such as, for example, web servers, video servers and the like for sourcing and/or controlling data, streaming media, web traffic and the like that are to be transported to other device(s) of the communication system 100.

The zone controllers 126 manages the provision of dispatch and telephone services (and also private call traffic) for devices of the communication system 100. In so doing, the zone controller 126 performs a number of tasks, including performing mobility management (i.e., tracking the location of the communication devices 106 as they move about the communication system 100) and assigning communication resources (e.g., bandwidth) for use by the communication devices. The zone controller 126 may further manage and assign IP multicast addresses for certain multicast groups or on a call-by-call basis, as is known in the art.

Typically, the mobility management functions of the zone controller 126 are performed by logical entities known as a home location register (HLR) and visitor location register (VLR). The HLR/VLR comprise location databases that store the current location, by site and zone, of each mobile or portable radio unit currently operating in the system. Additionally, the zone controller maintains a database including any group affiliations for radio units currently operating in the system. Thus, when a request for a group communication is received by the zone controller, the database is referenced to determine which sites and zones need to be included in order to complete the request. Once bandwidth and necessary connection(s) are established between the relevant site(s) and zone(s), the zone controller allows the communication to proceed. When a call includes participating devices at multiple sites, the zone controller may allow the call to proceed at fewer than all participating sites. Thus, for example, a talkgroup call may be granted for devices at a site that is in service but denied for devices at a site that is not in service (or awaiting service).

The network manager 128 comprises a user interface for configuring the communication system 100 and for performing system diagnostics. The network manager 128 is also often used to display faults and keep track of statistics and historical information for calls occurring within the communication system 100.

The telephony server 130 provides an interface between the zone controller 126 and public switched telephone network (PSTN) 142, such that the zone controller 126 may set up calls involving telephony devices 144 attached to the PSTN.

The conventional radio server 132 provides an interface between the zone controller 126 and base radios 104 at conventional RF sites, such that the zone controller 126 may set up calls involving radio units 106 at the conventional sites via dedicated RF channels.

The dispatch consoles 136 are devices that enable a user (typically referred to as a "dispatcher" or "dispatch operator") to communicate with, and to monitor communications between communication units 106 and/or other infrastructure devices, as is known in the art. For example, the consoles 136 can affiliate with talkgroups for monitoring purposes, that is to receive payload (e.g., audio, video, data) being communicated on the talkgroups, or to source payload for the talkgroups. The consoles 136 may also receive and process emergency ("911") requests from the PSTN.

The call logger 138 is a networked based device that records packetized voice talkgroup and private calls in a public safety system. A call logger could also record data calls. A call logger device typically stores the voice payload in its native format (i.e. vocoded audio). When it is desirable to playback the voice conversation at a later time, the call logger retrieves and decodes all packets which bound the call in question.

Practitioners skilled in the art will appreciate that the communication system 100 may include various other communication devices not shown in FIG. 1. These devices may include, but are not limited to comparator(s), scanner(s), IP telephony gateways, electronic mail gateways, paging gateways, game gateways and/or electronic commerce gateways. These devices are typically wireline devices, i.e., connected by wireline to the base site(s) or other infrastructure device(s) but may also be implemented as wireless devices. Generally, such communication devices may be either sources or recipients of payload and/or control messages routed through the system 100. These devices are described briefly below:

A comparator (or "voter") is a device, usually connected by wireline to various receivers (e.g., different base radios) receiving different instance(s) of a particular message or signal (e.g., from a wireless communication unit 106). The comparator receives and compares among the different instances of the signal that may be received by the different receivers, and produces an output message that is comprised of either an entire message from one of the receivers or a composite message comprised of segments of the message received from one or more of the receivers. Each message may be comprised of a plurality of message frames.

A scanner is a receiver that is adapted to monitor message transmissions from communication devices such as mobile or portable wireless radio units, consoles, base radios, and the like. In one mode of operation, for example, a scanner scans the radio spectrum for the purpose of finding and, optionally, locking on to carrier frequencies containing message transmissions. Scanners are sometimes used by parties that are not intended recipients of the message transmissions and thus may or may not be members of a particular talkgroup for which the message transmissions are intended.

Generally, a gateway device is one that provides voice and control translation services between two dissimilar communication systems. Other services such as feature translation, authentication, authorization and encryption could also be provided by a gateway device. For example, an IP telephony gateway may convert IP control and/or audio packets from the communication system 100 or 200 into the format of a local public switched telephone network (PSTN), or vice versa, thereby allowing telephone conversations to take place between the communication devices 106 and telephones connected to the PSTN. Similarly, electronic mail gateways, paging gateways, game gateways and electronic commerce gateways might provide translation services from the communication system 100 or 200 to an electronic mail server, paging server, game server, and electronic commerce server, respectively.

Figure 2:
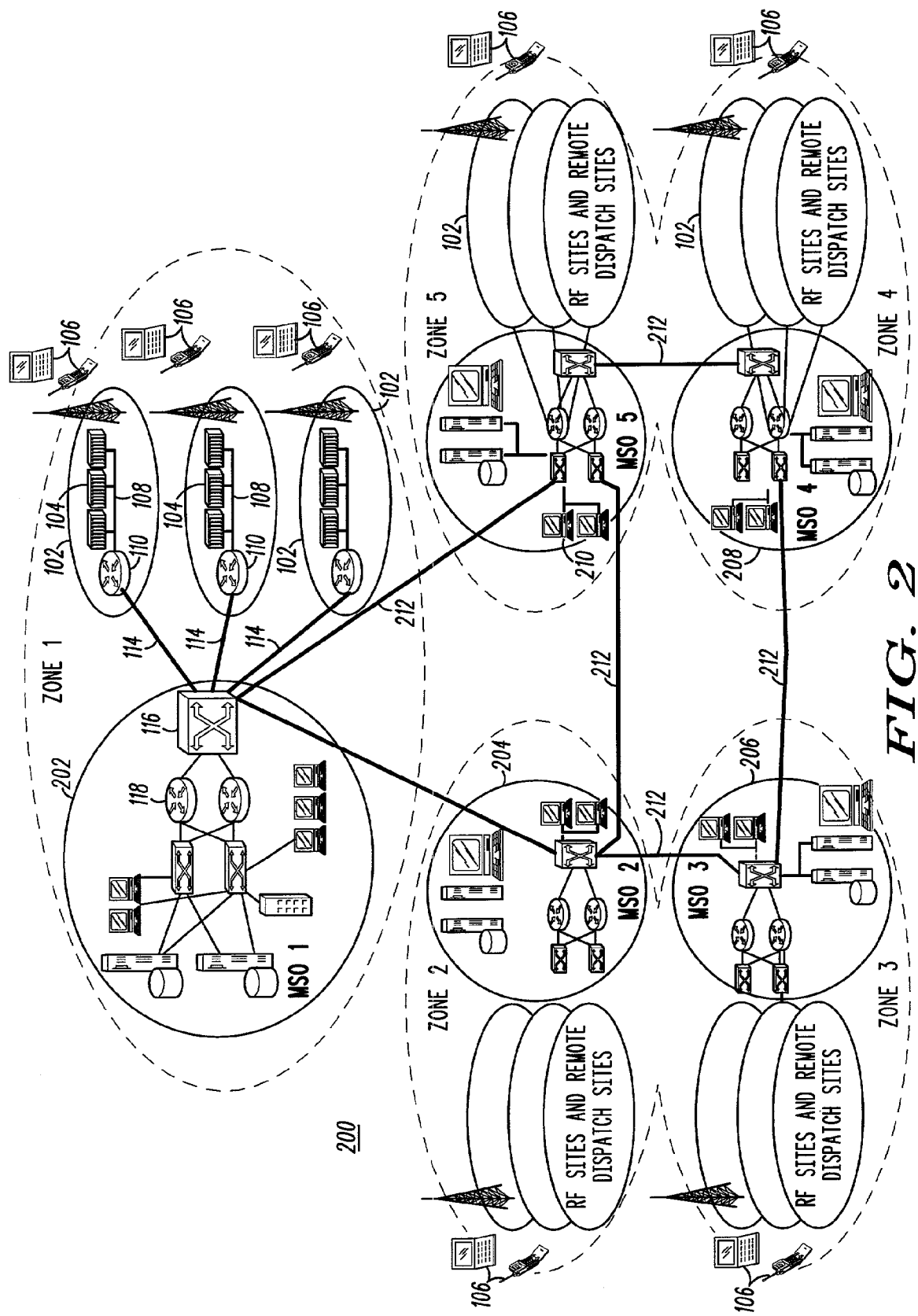
FIG. 2 shows an example multi-zone communication system operable to utilize a system restart sequence according to the invention.

FIG. 2 illustrates a communication system 200 including communication devices distributed among multiple zones. As shown, there are five communication zones (denoted "Zone 1" through "Zone 5") including respective infrastructure sites 202, 204, 206, 208, 210 known as main switching offices or MSOs (denoted "MSO 1" through "MSO 5"). The MSOs are connected by links 114 to various sites within their respective zones including, for example, RF sites, conventional sites or console sites. Typically, the MSOs are linked to each other via router elements 116 (or alternatively, central switches) and inter-MSO links 212. The inter-MSO links 212 may comprise T1 links, optical links or generally any type of link adapted for digital communications.

Generally, the infrastructure devices for each zone (typically located within the MSO) include a zone controller, network manager and any of the several other infrastructure devices and equipment described in relation to FIG. 1, including, for example, data and multimedia hosts, telephony servers, conventional radio servers, dispatch consoles, logging devices, etc. Although FIG. 2 shows a separate MSO for each zone, it is often the case that infrastructure equipment from multiple zones reside within the same MSO or even in the same physical device.

The zone controller(s) perform dispatch and telephone services, perform mobility management and resource allocation functions for communication devices within their respective zones, substantially as described in relation to FIG. 1. Where a call involves communication devices in multiple zones, a controlling zone controller may coordinate activities of zone controllers in other zones. For example, the zone controller of a sourcing zone may be configured as the controlling zone controller for a private call. Similarly, a controlling network manager may be configured statically or dynamically to coordinate network manager functions and/or access statistics and historical information from network managers in multiple zones. As will be appreciated, the manner of selecting the controlling zone controller and/or controlling network manager is beyond the scope of the present disclosure.

Figure 3:
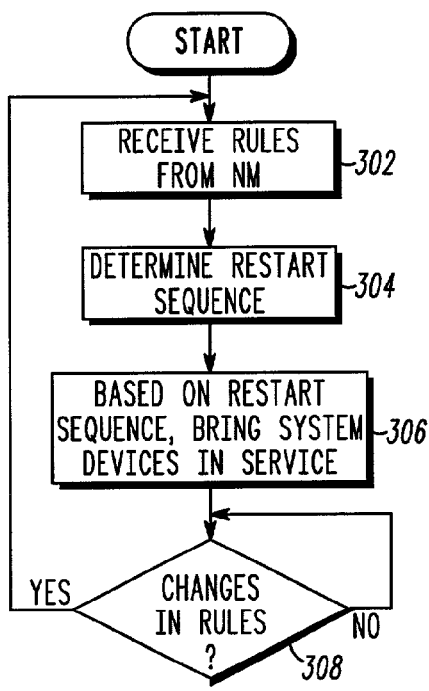
FIG. 3 is a flowchart showing steps performed by a controller to implement a system restart sequence according to one embodiment of the invention.

FIG. 3 shows steps performed to implement a restart sequence according to one embodiment of the invention. In one embodiment, the steps of FIG. 3 are implemented using stored software routines within a zone controller 126 (or, in a multi-zone system, a controlling zone controller) of a communication system having a plurality of communication devices distributed among one or more sites.

At step 302, the zone controller determines a rule-based criteria for prioritizing the sites. Alternatively or additionally, the rule-based criteria may be used for prioritizing particular communication devices within the sites. Further, in a multi-zone system, the rule-based criteria may be used for prioritizing particular zones. In one embodiment, the zone controller receives the rule-based criteria from the network manager 128 (or, in a multi-zone system, a controlling network manager) of the communication system. In such manner, the rules may be determined by a customer/operator, stored in the network manager and downloaded or retrieved by the zone controller. Alternatively, the rules may be stored in the zone controller.

As will be appreciated, the rule-based criteria may be defined in several possible ways, depending on the needs or desires of the customer/operator. Generally, the rules may be based on static information (e.g., network topology information) and/or dynamic information (e.g., mobility information, system usage information).

A variety of possible rule-based criteria are provided herein for purposes of example but not limitation:

One rule may comprise determining one or more priority communication devices, based on transmit priority. The transmit priority may relate to the priority of different sources per se (e.g., a dispatch console having a higher priority than a radio unit), the priority of different units of the same type (e.g., police radio having a higher priority than a dogcatcher radio) or the priority of the messages from the respective sources (e.g., emergency calls having a higher priority than status updates). However the priority communication devices are defined, the zone controller, in performing its mobility management functions, determines at which sites/zones the priority devices are located and designates these sites as priority sites/zones. Thus, for example, if dispatch consoles are defined as priority devices, the zone controller may designate console site(s) as priority site(s). As another example, if police radios are defined as priority devices, the zone controller may identify the locations of police radios at one or more sites and designate those sites as priority sites. The police radios (or generally, the higher priority radios) may correspond to particular predefined talkgroups. Thus, the zone controller may identify the locations of members of certain priority talkgroups at one or more sites and designate those sites as priority sites. Alternatively or additionally, unique priorities may be assigned to each radio within a particular talkgroup and sites prioritized, accordingly.

As will be appreciated, the designation of certain sites/zones as priority sites/zones based on locations of priority devices within those sites/zones is based on the last known information available to the zone controller and/or network manager. If a failure were to occur in the zone controller and/or network manager, it is possible that the sites/zones designated as priority sites/zones will not accurately reflect the location of priority devices, at least until such time as accurate mobility information is made available to the zone controller and/or network manager.

Another rule may comprise determining priority sites or zones based on numbers of communication devices or talkgroups at various sites. Thus, for example, a highest priority site may be determined as a site having the most affiliated subscribers, or having the most active talkgroups.

Still other rules may comprise determining priority sites or zones based on usage (e.g., voice traffic) at various sites. Thus, for example, a highest priority site may be determined as a site having the most voice traffic in a particular time period (e.g., hour, day, etc.) in numbers of air-time seconds; the site having the most call requests in a particular time period; the site having the most emergency calls in a particular time period, etc.

As will be appreciated, different rules may be exercised in combination to determine sub-priorities, as may be appropriate. For example, consider a rule defining console site(s) as priority site(s), as described above. A rule based on numbers of talkgroups may be used to determine priorities among the console sites. For example, the zone controller may determine a first console site monitoring two talkgroups to have priority over a second console site monitoring a single talkgroup.

At step 304, the zone controller determines, based on the criteria, a restart sequence for the sites. In the preferred embodiment, the restart sequence designates a highest priority site as a first site to be restarted, a second highest priority site as a second site to be restarted, and so forth.

Then, at step 306, the zone controller brings system device(s) into service at various sites based on the restart sequence. In one embodiment, the restart sequence defines a specific order, timing, etc. in which devices within the respective sites are to be brought into service. For example, the restart sequence may dictate that zone controllers should be the first devices brought into service within their respective sites. Alternatively or additionally, the restart sequence may define a specific order, timing, etc. in which information is to be downloaded or service capabilities established for devices within the respective sites. For example, the restart sequence may dictate that zone controllers should receive network topology information before receiving updated mobility information. As will be appreciated, the restart sequence may dictate any combination of device sequence, information sequence, etc. such that there may be an overlap between service being established for different devices. Thus, for example, consider the case where the restart sequence begins with the zone controller and is to be followed by consoles at a particular site. In such case, the restart sequence might commence bringing the consoles into service before functionality is fully established for the zone controller.

At step 308, the zone controller determines whether there are any changes in rules. For example, the zone controller may receive periodic updates of the rule-based criteria from the network manager. If so, the process returns to step 302 to receive the updated rules. Otherwise, until such time as it receives a change in rules, the zone controller continues to use the previous rules for prioritizing the sites and/or communication devices.

Figure 4:
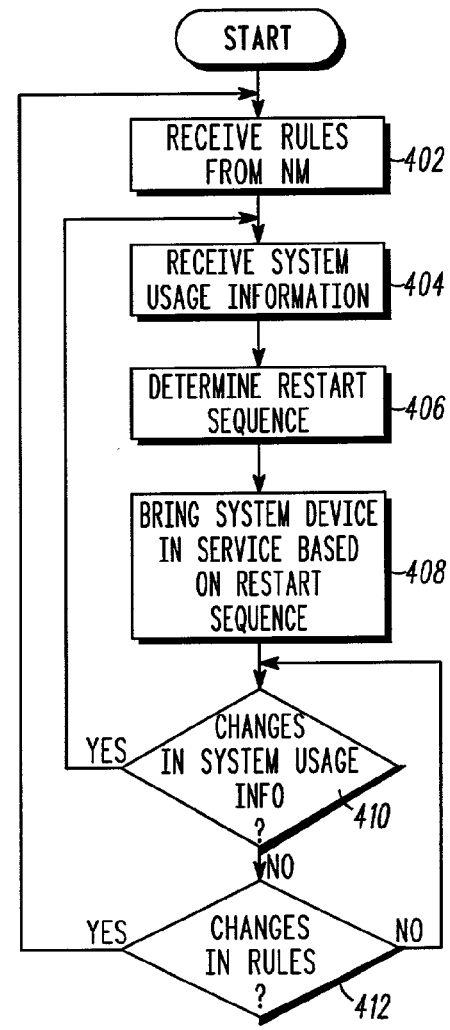
FIG. 4 is a flowchart showing steps performed by a controller to implement a system restart sequence incorporating system usage information according to one embodiment of the invention.

FIG. 4 shows steps performed to implement a restart sequence incorporating system usage information according to one embodiment of the invention. In one embodiment, the steps of FIG. 4 are implemented using stored software routines within a zone controller 126 (or, in a multi-zone system, a controlling zone controller) of a communication system having a plurality of communication devices distributed among one or more sites.

At step 402, the zone controller determines a rule-based criteria for prioritizing the sites or zones and/or communication devices within the sites/zones. In one embodiment, the zone controller receives the rule-based criteria from the network manager 128 (or, in a multi-zone system, a controlling network manager) of the communication system. The rules may be determined by a customer/operator in any of several possible ways, including, but not limited to the examples described in relation to FIG. 3.

At step 404, the zone controller receives system usage information associated with the sites and/or communication devices. The system usage information may comprise, for example, historical data, statistical data, call records, mobility data, and so forth. In one embodiment, the zone controller receives the system usage information from the network manager 128 (or, in a multi-zone system, a controlling network manager) of the communication system.

At step 406, the zone controller determines, based on the rule-based criteria and system usage information, a restart sequence for the sites. In the preferred embodiment, the restart sequence designates a highest priority site as a first site to be restarted, a second highest priority site as a second site to be restarted, and so forth.

Then, at step 408, the zone controller brings system device(s) into service at various sites based on the restart sequence. In one embodiment, the restart sequence defines a specific order, timing, etc. in which information is to be downloaded for devices within the respective sites. For example, the restart sequence may dictate that zone controllers have priority over other devices within the respective sites.

At step 410, the zone controller determines whether there are any changes in system usage information and at step 412, whether there are any changes in the rule-based criteria. The zone controller may receive periodic updates of the system usage information and/or rule-based criteria from the network manager. In the former case, the process returns to step 404 to receive the updated system usage information and in the latter case, the process returns to step 402 to receive the updated rule-based criteria.

Otherwise, until such time there is either a change in rules or system usage information, the zone controller continues to use the previous rules and system usage information for prioritizing the sites and/or communication devices.

The present disclosure therefore has identified a method for bringing sites and/or zones into service in an optimized, orderly fashion after system upgrades, failures, installations, etc. The method allows the customer to define a rule-based criteria for determining the restart sequence, which rules may be updated dynamically or applied using dynamically changing information including historical usage data, mobility information and the like. Advantageously, the method helps reduce or eliminate missed conversations between members of specific talkgroups.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system having a plurality of communication devices distributed among one or more sites, a method comprising the steps of:
   determining a rule-based criteria for prioritizing the sites;
   determining, based on the criteria, a restart sequence for the sites; and
   in the event of a system restart, establishing service for the sites in order of the restart sequence.

2. The method of claim 1, performed by a network manager of the communication system.

3. The method of claim 1, performed by a zone controller of the communication system, the step of determining a rule-based criteria comprises receiving the rule-based criteria from a network manager of the communication system.

4. The method of claim 3, wherein the step of determining a rule-based criteria comprises receiving periodic updates of the rule-based criteria from the network manager.

5. The method of claim 1, wherein the step of determining a rule-based criteria comprises:
   determining one or more priority communication devices; and
   prioritizing the sites based on locations of the one or more priority communication devices among the one or more sites.

6. The method of claim 1, wherein the step of determining a rule-based criteria comprises:
   determining one or more priority talkgroups; and
   prioritizing the sites based on locations of affiliated talkgroup members of the one or more priority talkgroups among the one or more sites.

7. The method of claim 1, wherein the step of determining a rule-based criteria comprises defining a console site as a highest priority site based on a number of monitored talkgroups at the console site.

8. The method of claim 1, wherein the plurality of communication devices are distributed among one or more sites and zones, the step of determining a rule-based criteria comprises determining a rule-based criteria for prioritizing the sites and zones, the step of determining a restart sequence comprises determining a restart sequence for the sites and zones, and the step of establishing service comprises establishing service for the sites and zone in order of the restart sequence.

9. In a communication system having a plurality of communication devices distributed among one or more sites, a method comprising the steps of:
   determining a rule-based criteria for prioritizing the sites;
   obtaining system usage data associated with the sites;
   determining, based on the rules and system usage data, a restart sequence for the sites; and
   in the event of a system restart, establishing service at the sites in order of the restart sequence.

10. The method of claim 9, performed by a network manager of the communication system.

11. The method of claim 9, performed by a zone controller of the communication system, the step of determining a rule-based criteria comprises receiving the rule-based criteria from a network manager of the communication system.

12. The method of claim 11, wherein the step of obtaining system usage data comprises receiving the system usage data from a network manager of the communication system.

13. The method of claim 9, wherein the step of determining a rule-based criteria comprises prioritizing the sites based on subscriber activity among the one or more sites.

14. The method of claim 13, wherein the step of prioritizing the sites based on subscriber activity comprises prioritizing the sites based on numbers of affiliated subscribers among the one or more sites.

15. The method of claim 13, wherein the step of prioritizing the sites based on subscriber activity comprises prioritizing the sites based on air-time usage among the one or more sites.

16. The method of claim 13, wherein the step of prioritizing the sites based on subscriber activity comprises prioritizing the sites based on numbers of call requests among the one or more sites.

17. The method of claim 9, wherein the plurality of communication devices are distributed among one or more sites and zones, the step of determining a rule-based criteria comprises determining a rule-based criteria for prioritizing the sites and zones, the step of obtaining system usage data comprises obtaining system usage data associated with the sites and zones, the step of determining a restart sequence comprises determining a restart sequence for the sites and zones, and the step of establishing service comprises establishing service for the sites and zone in order of the restart sequence.

* * * * *